June 27, 1933.   R. K. KENNA   1,916,055
BRAKE ACCESSORY FOR PNEUMATIC TIRE VEHICLES
Filed March 1, 1930    2 Sheets-Sheet 2
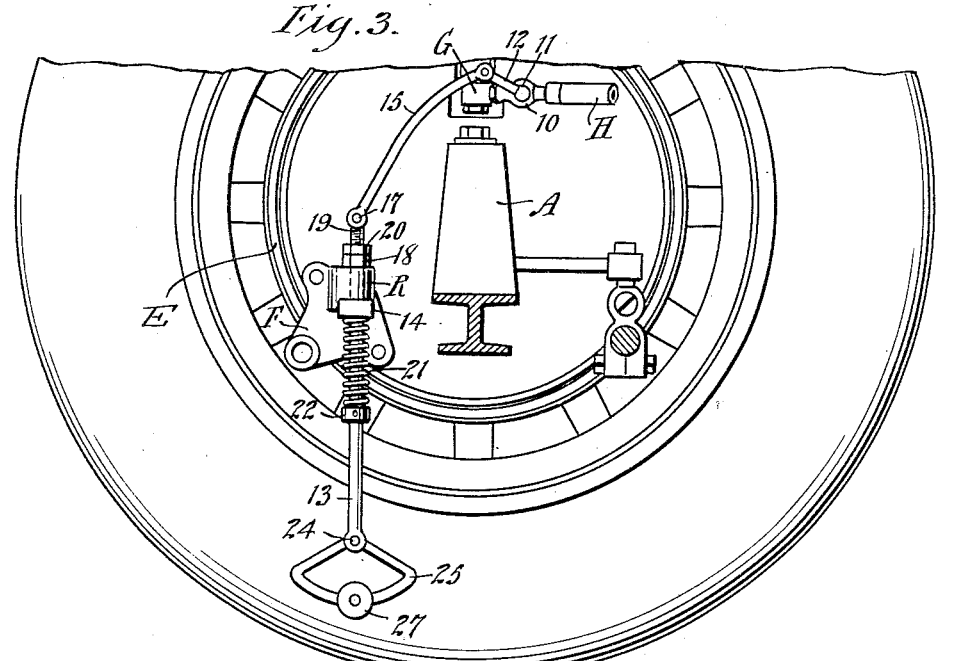
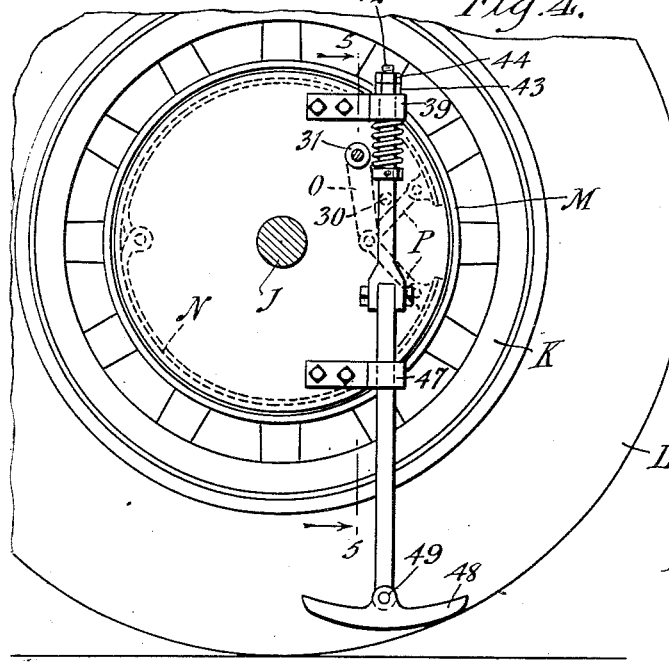
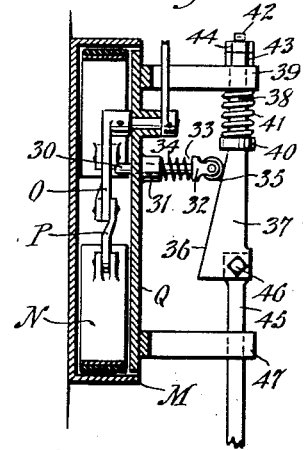
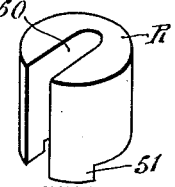
INVENTOR
R. K. Kenna
BY
ATTORNEY Patented June 27, 1933

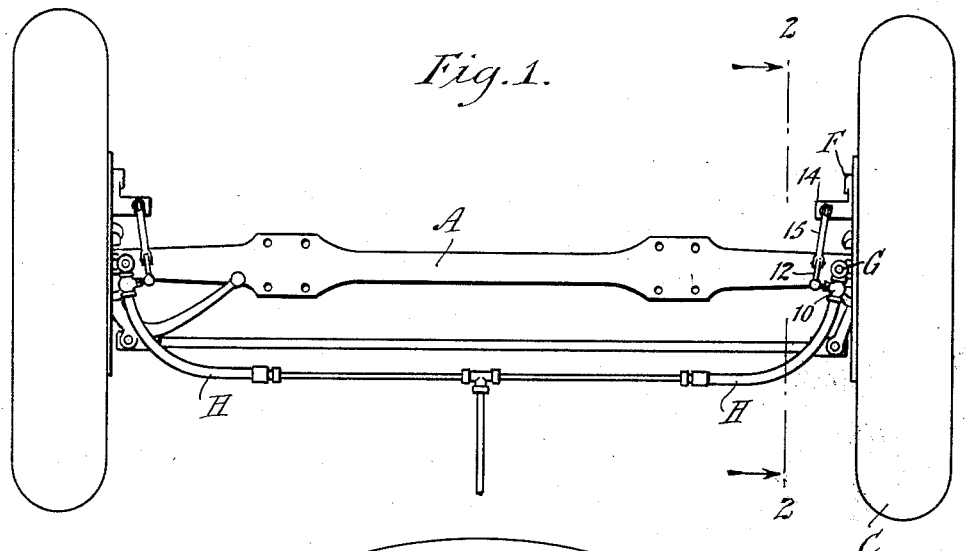

1,916,055

UNITED STATES PATENT OFFICE

RICHARD K. KENNA, OF NEW YORK, N. Y.

BRAKE ACCESSORY FOR PNEUMATIC TIRE VEHICLES

Application filed March 1, 1930. Serial No. 432,439.

This invention relates to an accessory for wheeled vehicles equipped with pneumatic tires, and broadly comprehends means for preventing the skidding and possible overturning of a vehicle due to a puncture, blowout or other sudden deflation of a tire, especially when the vehicle is traveling at a high rate of speed, and more particularly where the tires are of large diameter.

The sudden deflation of a tire coupled with the application of a uniform braking force applied to the wheel of the deflated tire and the corresponding opposite wheel carrying an inflated tire causes a swerving or skidding tendency, or deviation of the vehicle from its normal path of movement. This may result in overturning of the vehicle depending upon the rate of speed and the size of the tires due to the drop of the chassis and the drag or increased friction developed between the deflated tire and the road.

To overcome this, the present invention aims to provide means operable by the deflation of a tire for automatically diminishing or totally negativing the braking force applied to the wheel carrying the deflated tire.

It has further been observed where anti-skid chains are used on the rear wheels of vehicles equipped with pneumatic tires and four-wheel brakes, that there is a tendency for the front wheel to grab and lock more quickly where a uniform braking force is applied to all four wheels. Hence, the present invention aims as a further object to provide means for readily adjusting the front wheel brakes to cause a reduction in the braking force of the same when the brakes are applied to compensate for the tendency of the front wheels to more quickly grab and lock when anti-skid chains are employed on the rear wheels.

The invention aims as a still further object to provide means of the character set forth which may be inexpensively produced and installed on a vehicle without requiring material alteration thereto, and which means is thoroughly reliable and highly efficient in its purpose.

With the above recited and other objects in view, reference is had to the following description and accompanying drawings, in which there is exhibited one example or embodiment of the invention, while the claims define the actual scope of the same.

In the drawings:

Figure 1 is a plan view of the front axle and wheels of a motor vehicle equipped with hydraulic brakes and an accessory constructed in accordance with the invention and showing its general application thereto.

Figure 2 is an enlarged transverse sectional view taken approximately on the line indicated at 2—2 in Figure 1, illustrating in full and dotted lines the normal inactive and active positions of the accessory.

Figure 3 is a similar view illustrating the device used in connection with the accessory for adjusting the braking force of the front wheels to overcome the tendency of the front wheels to grab and lock when anti-skid chains are used on the rear wheels.

Figure 4 is a similar view illustrating the adaptation of the accessory to mechanically operated brakes.

Figure 5 is a fragmentary transverse sectional view taken approximately on the line indicated at 5—5 in Figure 4.

Figure 6 is a perspective view of one of the devices employed for regulating the braking force applied to the front wheels when anti-skid chains are used on the rear wheels.

Referring to the drawings by characters of reference, A designates the axle, B the vehicle wheel, C the pneumatic tire, D the brake drum, E the brake band, and F the brake anchor block bracket. The brake wheel cylinder G of the hydraulic brake actuating system has interposed between the brake pipe hose H which leads from and communicates with the master cylinder, a valve 10 of the well known rotary core type which is provided with a stem 11 having an arm 12. Obviously, by turning the arm, the valve serves either to partially or wholly cut off communication between the brake pipe hose H and the brake wheel cylinder G so as to regulate the size of the passage of the fluid anywhere from a full open position of the valve to a fully closed position.

In order to provide means automatically operable by the deflation of the tire C for actuating the valve 10, an actuator rod 13 is mounted for vertical movement in a bearing lug or ear 14 carried by the brake anchor bracket F, and the upper end of said rod is operatively connected by a link 15 with the free extremity of the valve stem arm 12, the link being respectively pivoted as at 16 and 17 at its opposite ends to said stem 12 and actuator rod 13. The actuator rod 13 is provided with an adjustable abutment 18 which is in the nature of a nut threadedly engaged on the threaded upper end 19 of the rod 13 and maintained in adjusted position by a lock nut 20. A coiled expansion spring 21 serves to normally project the rod downwardly to engage the abutment 18 with the bearing ear or lug 14, and this is preferably accomplished by interposing the opposite end convolutions of the spring 21 between the under side of the ear or lug 14 and a collar 22 which is carried by and secured to the actuator rod 13. Preferably, the lower end 23 of the actuator rod pivotally carries on a fulcrum 24 a shoe 25, which shoe may be of any suitable construction to perform its function. As illustrated, the shoe is preferably formed with an arcuate lower end 26 having a roller 27 journaled thereon at the medial portion thereof. The object of freely pivoting the shoe to the lower end of the actuator rod 13 is to permit the same free swinging movement in event of striking rocks, ruts or other obstructions encountered on the road. The lower end of the actuator rod and its shoe are so positioned that they normally are disposed above the road surface I in the position illustrated in full lines in Figure 2. In this normal position the spring 21 functions, together with the abutment 18 and link 15, to maintain the valve stem arm 12 and valve 10 in its fully opened normal position. Obviously, in event of a sudden deflation of the tire C due to a puncture, blow-out or the like, the dropping of the wheel of the deflated tire will project and maintain the actuator rod 13 upwardly in the dotted line position illustrated, thereby causing either a partial or total closing of the valve 10 to automatically diminish or totally negative the braking force which will be applied to the wheel which carries the deflated tire, and this without affecting in any manner the braking force which is applied to the corresponding opposite wheel or the remaining wheels of the vehicle. The diminishing or negativing of the braking force on the wheel carrying the deflated tire will serve to overcome the tendency of the vehicle to deviate from its normal path of movement and will hence impede the swerving or skidding which might result in overturning.

The accessory may also operate in connection with mechanical braking systems, and this is illustrated by way of example in Figures 4 and 5 of the drawings, in which J designates the axle, K the vehicle wheel, L the pneumatic tire, M the brake drum and N the brake band, which is of the internal expansion type which is expanded by movement of the brake actuating arm O and the links P which connect the free end of the arm O with the ends of the brake band. In this instance, the means which is automatically operable by the deflation of the tire L for restricting or preventing the throw of the brake actuating arm O, consists of a pin 30 which is mounted for projection into the path of movement of the arm O in a bearing boss 31 formed on the inner side cover plate Q of the brake drum. The outwardly protruding portion of the pin is provided with a head 32 at its outer extremity which defines a shoulder 33 between which and the boss 31 a coiled expansion spring 34 is interposed for normally retracting the inner end of the pin 30 to a position out of the path of movement of the brake actuating arm O. The head 32 of the pin has journaled therein a roller 35, and said roller coacts with a cam or wedge face 36 of a vertically movable cam or wedge block 37. The cam or wedge block is formed with an upwardly projecting extension rod 38 which is slidably mounted in a bearing bracket 39. A collar 40 is carried by the extension rod 38, and interposed between said collar and the bearing bracket 39 is a coil expansion spring 41 which normally forces the cam or wedge block 37 downwardly. The upper end of the extension rod 38 is threaded as at 42 and receives thereon an adjustable abutment 43 which is in the nature of a nut adapted to contact with the upper face of the bearing bracket 39 to limit the downward movement of the cam or wedge block 37 under the action of the spring 41. A lock nut 44 is also threaded on the end 42 to retain the adjustable abutment nut 43 in its adjusted position. The cam or wedge face 36 of the cam or wedge block 37 is arranged so that in its normal downwardly projected position under the action of the spring 41, the pin 30 is retracted out of the path of movement of the brake actuating arm O. In order to move the cam or wedge block 37 upwardly when the tire L is deflated by virtue of a puncture, blow-out or otherwise, an actuator rod 45 is provided which is connected as at 46 with the lower end of the block 37, and said actuator rod 45 extends downwardly through a bearing bracket 47 and is provided at its lower end with a shoe 48 freely fulcrumed thereto as at 49. Obviously, the deflation of the tire permitting the wheel to drop exerts an upward thrust on the actuator rod 45 by virtue of its contact with the road. This in turn moves the cam or wedge block 37 upwardly, camming or moving the pin 30 inwardly into the path of movement of the brake actuating arm O, thereby regulating, reducing or negativing the braking force applied to the wheel carrying the deflated tire.

In order to provide means for overcoming the tendency of the front wheels to grab and lock more quickly than the rear wheels on vehicles equipped with brakes on more than one axle and with accessories of the type of or equivalent to those shown, devices designated generally by the reference character R and particularly illustrated in Figures 3 and 6 are employed. These devices are in the nature of washers which are longitudinally or axially slotted as at 50 and provided at one end with axially projecting lugs 51. The devices R are designed to be inserted between the abutment nuts 18 or 43 and the bearing bracket 14 or 39. In Figure 3, the device R is shown inserted between the abutment nut 18 and the bearing bracket 14 of the front wheel accessory, thereby through the medium of the link connection with the valve stem arm turning the valve core of the valve 10 to a position which reduces the braking force applied to the front wheel, hence, restoring the tendency of the front wheels and rear wheels to grab or lock simultaneously. The devices R may be conspicuously colored in order to attract attention to insure their removal when the anti-skid chains are moved.

What is claimed is:

1. The combination with a vehicle equipped with ground wheels having pneumatic tires and a hydraulic brake system, of means operable by the deflation of a tire for regulating the flow of hydraulic pressure to the brake carrying the deflated tire.

2. The combination with a vehicle equipped with ground wheels having pneumatic tires and a hydraulic brake system, of means operable by the deflation of a tire for regulating the flow of hydraulic pressure to the brake carrying the deflated tire, said means consisting of a valved conduit leading from the master cylinder of the braking system to each wheel and actuating means for said valve operable by contact with the road when a tire is deflated.

3. The combination with a vehicle having foot controlled brakes on the front and rear wheels, of means independent of the foot control for individually limiting the brake applications of each separate wheel and devices adapted to be manually emplaced to act upon said brake limiting means, for causing the front wheel brake applications to be retarded relative to the rear wheel brake applications.

Signed at the city of New York, in the county of New York and State of New York this twenty-seventh day of February, A. D. 1930.

RICHARD K. KENNA.